Sept. 1, 1942.         T. I. DUFFY         2,294,839
VEHICLE CONSTRUCTION
Filed Sept. 11, 1939
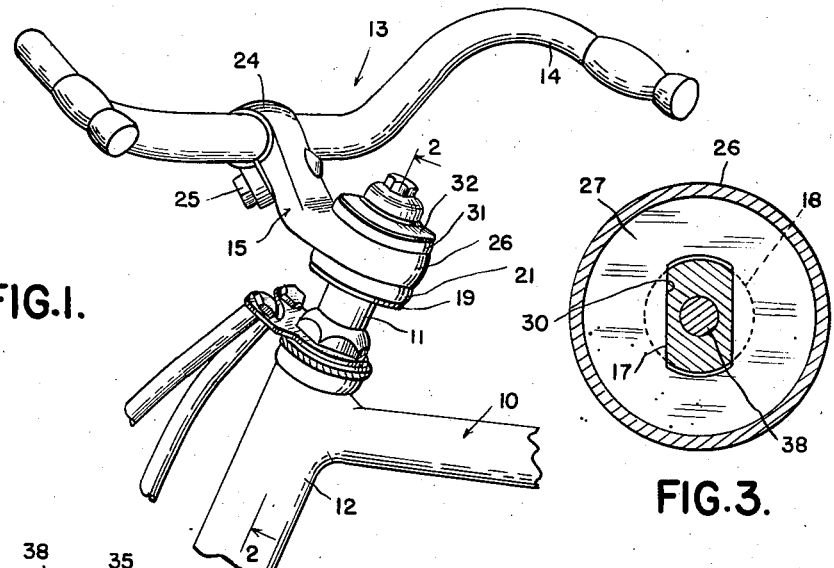
FIG.1.
FIG.3.
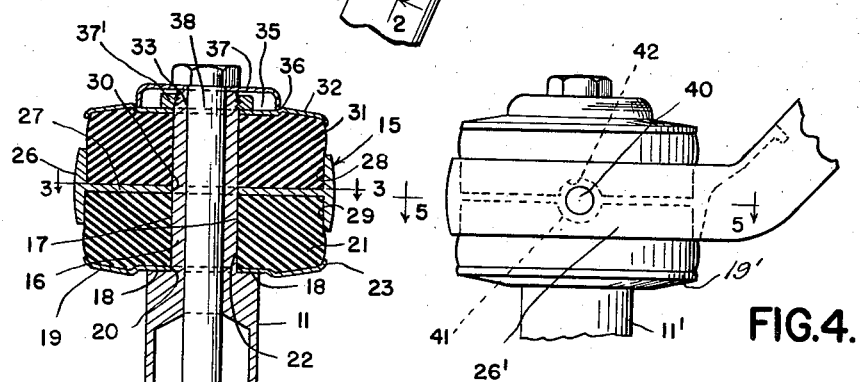
FIG.4.
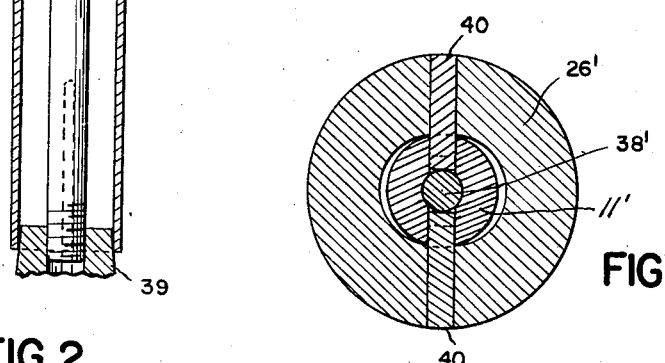
FIG.2.
FIG.5.
INVENTOR.
THOMAS I. DUFFY
BY *Whittemore Hulbert & Belknap*
ATTORNEYS Patented Sept. 1, 1942

2,294,839

UNITED STATES PATENT OFFICE 2,294,839

VEHICLE CONSTRUCTION

Thomas I. Duffy, Detroit, Mich., assignor to Ethel M. Benedict, Highland Park, Mich.

Application September 11, 1939, Serial No. 294,383

1 Claim. (Cl. 74—551.2)

This invention relates generally to vehicles and refers more particularly to an improved mounting for the steering control assembly of a vehicle.

One of the principal objects of the present invention is to provide means for dampening the shocks transmitted through the frame of the vehicle to the steering control assembly and to accomplish this result without detracting from the efficiency of operation of the steering control assembly to affect steering of the vehicle.

Another advantageous feature of the present invention consists in mounting the steering control assembly on the steering post of the vehicle through the medium of rubber pads or blocks held under compression against opposite sides of the control assembly and effective to clamp the control assembly in place on the steering post.

A further advantageous feature of this invention resides in the provision of a vehicle of the type set forth wherein the steering control assembly is pivotally mounted on the steering post for swinging movement in a vertical plane relative to the post and wherein the swinging movement is resisted by blocks of rubber material held under compression against opposite sides of the control assembly.

The foregoing, as well as other objects, will be made more apparent as this description proceeds, especially when considered in connection with the accompanying drawing, wherein:

Figure 1 is a fragmentary perspective view of a vehicle having a steering control assembly mounted in accordance with the present invention;

Figure 2 is a sectional view taken subtsantially on the plane indicated by the line 2—2 of Figure 1 with the frame and associated parts removed for the sake of clearness;

Figure 3 is a sectional view taken substantially on the line 3—3 of Figure 2;

Figure 4 is a fragmentary elevational view of a slightly modified form of mounting;

Figure 5 is a sectional view taken substantially on the plane indicated by the line 5—5 of Figure 4.

For the purpose of illustrating the present invention, I have selected a bicycle having a frame 10 and having a steering post 11 rotatably supported in the front bar 12 of the frame in accordance with conventional practice. The upper end of the steering post 11 projects beyond the corresponding end of the frame bar 12 and is connected to a steering control assembly 13 having a handle bar 14 connected intermediate the ends thereof to the upper end of the post 11 by means of a fixture or bracket 15.

In detail, the upper end portion 16 of the post is fashioned with opposed substantially flat surfaces 17 forming shoulders 18 at opposite sides of the post. A disc or washer 19 having a central opening 20 corresponding in shape to the cross sectional contour of the portion 16 is sleeved over the latter portion and rests upon the shoulders 18. The disc 19 forms a seat for a bushing or block 21 formed of rubber or from a suitable rubber-like material possessing the desired resilient characteristics and the latter is fashioned with an opening 22 therethrough corresponding in shape to the cross sectional contour of the portion 16 so as to permit sleeving the bushing over the portion 16 of the post. As shown in Figure 2, the periphery of the disc 19 is provided with an upwardly extending annular flange 23 at the periphery thereof surrounding the lower end of the bushing and effective to resist spreading of the lower end portion of the bushing under pressure.

The bracket 15 is shown in Figure 1 as having a clamp 24 at one end adapted to be secured to the handle bar 14 intermediate the ends of the latter by means of the fastener element 25 and as having a hub 26 at the opposite end. Upon reference to Figure 2, it will be noted that the hub 26 is provided with a horizontal web 27 intermediate the ends of the hub providing annular recesses 28 and 29 at opposite ends of the hub. The web 27 is formed with an opening 30 therethrough having a shape corresponding to the cross sectional area 16 of the post and is adapted to be sleeved over the post to assume a position above the rubber bushing 21. The annular recess 29 at the bottom of the hub has a diameter which approximates the diameter of the bushing 21 and the upper end of the bushing fits into the annular recess 29.

A second rubber bushing 31, identical in construction to the bushing 21, is sleeved over the upper portion 16 of the post and is positioned with the lower end thereof extending into the annular recess 28 in the upper end of the hub 26. After the second bushing 31 has been properly positioned on the steering post, a second disc 32 is sleeved over the reduced upper end 33 of the post in seating engagement with the adjacent end of the rubber bushing 31. The disc 32 is in the form of a stamping having a central portion depressed to form a recess 35 providing an annular shoulder 36 for engagement with the periphery of an inverted cup-shaped finishing member 37. The inverted cup-shaped finishing member 37 conceals a clamping nut 37' threaded on the reduced upper end 33 of the post and cooperating with the shoulder 18 to clamp the bushings on the post.

As shown in Figure 2, a bolt 38 extends axially through the steering post 11 and threadedly engages the upper end of an expander plug 39. The upper end of the plug 39 is tapered and extends into the lower end of the post in a manner to have a wedging engagement with the post when the bolt 38 is turned in a direction to thread the same into the plug. It follows, therefore, that the handle bar 13 is effectively clamped to the steering post and at the same time vibrations or shocks are absorbed prior to being transmitted to the handle bar.

In certain types of installations, it may be desirable to mount the steering control on a steering post having a tubular upper end portion and at the same time provide a positive connection between the handle bar and the steering post. Accordingly, I have provided the alternative construction shown in Figures 4 and 5. The essential difference between the modification shown in Figures 4 and 5 and the one previously described is that the upper end of the post 11' is tubular in cross section and the hub 26' is positively pinned to the steering post by means of aligned pins 40. The pins 40 are carried by the hub at diametrically opposite sides of the steering post and the radially inner ends of the pins extend into the steering post to positions adjacent the opposite sides of the bolt 38'. In this connection, it will be noted that the hub 26' is fashioned with embossed portions 41 for receiving the pins and the adjacent ends of the rubber bushings are provided with registering recesses 42 for receiving the embossed portions 41.

The pins 40 are in alignment with each other and extend at right angles to the axis of the steering post, with the result that the turning torque applied to the handle bars is transmitted directly to the steering post through the pins. However, the central opening through the hub is elongated slightly in a direction extending at right angles to the pins 40 permitting limited swinging movement of the handle bar about the common axis of the pins. This swinging movement is, of course, resisted by the rubber bushings, with the result that in this construction, the bushings also serve to dampen vibrations or shocks transmitted from the frame to the handle bar.

In assembly, the bottom bushing is located on the washer 19' and after the hub 26' is positioned on top of the bushing, the latter is compressed sufficiently to permit inserting the pins 40 in assembled relation with the post. The top bushing is then positioned in the hub and secured in place by a nut threaded on the post in the same manner described in connection with the embodiment illustrated in Figures 1 to 3, inclusive.

What I claim as my invention is:

A bicycle having a steering post provided with a shoulder intermediate the ends thereof and having a handle bar for rotating the post, a bracket having a portion attachable to the handle bar and having a tubular hub portion provided with a transverse web intermediate the ends thereof apertured to receive the post, tubular blocks of rubber material sleeved on the post at opposite sides of the web and having the adjacent ends extending into opposite ends of the hub portion into engagement with opposite sides of the web, and means on the post cooperating with the shoulder to secure the rubber blocks under compression against opposite sides of the web.

THOMAS I. DUFFY.